US006710142B2

(12) United States Patent
Kaneko et al.

(10) Patent No.: US 6,710,142 B2
(45) Date of Patent: Mar. 23, 2004

(54) METHOD OF EXTRACTING GASEOUS FLUID

(75) Inventors: Yasunobu Kaneko, Chiba (JP); Takamichi Matsumura, Chiba (JP); Tomoo Nambu, Chiba (JP); Itaru Matsuhiro, Chiba (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 10/311,212

(22) PCT Filed: Mar. 13, 2002

(86) PCT No.: PCT/JP02/02355

§ 371 (c)(1), (2), (4) Date: Dec. 16, 2002

(87) PCT Pub. No.: WO02/078828

PCT Pub. Date: Oct. 10, 2002

(65) Prior Publication Data

US 2003/0187157 A1 Oct. 2, 2003

(30) Foreign Application Priority Data

Mar. 15, 2001 (JP) ....................................... 2001-073863

(51) Int. Cl.[7] ................................................... C08F 2/00

(52) U.S. Cl. ......................... 526/88; 210/218; 210/539; 422/255; 366/10

(58) Field of Search ............................ 526/88; 210/218, 210/539; 422/255; 366/10

(56) References Cited

U.S. PATENT DOCUMENTS 3,944,534 A * 3/1976 Sennari et al. ............. 260/93.7
4,607,958 A 8/1986 Ohshima et al.

* cited by examiner

*Primary Examiner*—William K. Cheung
(74) *Attorney, Agent, or Firm*—Oblon, Spivak, McClelland, Maier & Neustadt, P.C.

(57) ABSTRACT

There is provided a method for extracting a gaseous fluid which comprises extracting the gaseous fluid through fluid extraction ports set up on the top face portion of a vertical-type agitation tank equipped inside with an agitator, wherein two fluid extraction ports are set up at positions approximately symmetrical about the center of the top face portion of the vertical-type agitation tank, or wherein at least three fluid extraction ports are set up each at a vertex of an approximately regular polygon having the central point identical with the center of the top face portion of the vertical-type agitation tank. It is made possible by the foregoing method to suppress the entrainment of fine particles and mist, curtail clogging of a filter and the like, contrive uniformization for the temperature of the content and at the same time, ensure a stable operation by extracting a gaseous fluid through a plurality of extraction ports each set up at a specific position on the top face of a vertical-type agitation tank.

8 Claims, 5 Drawing Sheets

(a)

(b)

METHOD OF EXTRACTING GASEOUS FLUID

TECHNICAL FIELD

The present invention relates to a method for extracting a gaseous fluid. More particularly, it concerns with a method for extracting a gaseous fluid which is capable of suppressing the entrainment of fine particles and mist, curtailing clogging of a filter and the like, and ensuring a stable operation in the case of extracting a gaseous fluid through an extraction port set up on the top face portion of a vertical-type agitation tank.

BACKGROUND ART

In the case of extracting a gaseous fluid through an extraction port placed on the top face portion of a vertical-type agitation tank, there is generally taken a countermeasure for preventing the entrainment of the content of the tank, for instance, the entrainment of solids in an agitation tank the content of which is in the form of solid, and the entrainment of mist in an agitation tank the content of which is in the form of liquid. Specifically, in these cases there is generally taken a countermeasure of assuring a space from the surface of the content to the top face portion of the agitation tank, spraying a liquid at a high velocity, or setting up a baffle plate in the vicinity of a fluid extraction port inside the agitation tank.

However, in the case of scaleup of the treatment capacity of the above-mentioned vertical-type agitation tank, when being geometrically similar, the tip velocity of an agitation blade increases with an increase in a superficial velocity of the gaseous fluid in the tank, whereby the swirling velocity increases and thus, the entrainment of fine particles and mist (hereinafter sometimes referred to as "Entrai") is directed to acceleration.

Since the spraying effect is decreased in the case of the agitation tank being in a high pressure system, the above-mentioned problem of entrainment becomes further conspicuous, thus unreasonably increasing the frequency of replacing a filter set up on the downstream side of the fluid extraction port. As a result, continuous operation of the agitation tank is made impossible thereby as the case may be. As mentioned hereinbefore, in the case of scaleup of the treatment capacity of the agitation tank, an effective suppressing method for the "Entrai" is made indispensable.

It is a general procedure in a vertical-type agitation tank to locate a gaseous fluid extraction port at the center of the top face portion thereof. In this case, even if there exists no problem of entrainment in particular in a small scale of an agitation tank, a large scale thereof sometimes exaggerates the aforesaid problem to the extent that an ordinary operation is disturbed by an increased amount of entrainment due to the synergistic effect of swirling flow and upward flow.

In the case of a vertical-type agitation reaction tank equipped with one gaseous fluid extraction port at a position eccentric from the center of the top face portion thereof, there is raised a problem in that internal swirling flow is made nonuniform by the influence of the aforesaid extraction port, and thus liquid propylene as a coolant which is sprayed for cooling is not uniformly distributed on the surface of powders, thereby inducing un-even temperature distribution inside the reaction tank.

In FIG. 1 and FIG. 2, (a) a schematic side view and (b) a schematic plan view, respectively shows the positions of fluid extraction ports set up on the top face portion of a conventional vertical-type agitation tank whose positions are different from each other. The vertical-type agitation tank illustrated on FIG. 1 contains a content 5 and has such a structure that is equipped with an agitator 2 inside an approximately cylindrical tank 1 and with one fluid extraction port 4 approximately at the center A of the top face portion 3 (the same also applies to the followings).

The vertical-type agitation tank illustrated on FIG. 2 has such a structure that is equipped with an agitator 2 inside an approximately cylindrical tank 1 and with one fluid extraction port 4 at a position eccentric from the center A of the top face portion 3.

On the other hand, there is disclosed a vertical-type agitation reaction tank equipped with two fluid extraction ports at two positions of the top face portion in Japanese Patent Publication No. 30539/1977 (Shouwa 52). The above-mentioned two fluid extraction ports in the reaction tank are each set up at a position eccentric from the center of the top face portion, and not at a symmetrical position about the center. However, problems such that the working effect on suppressing the entrainment is limited, a spraying liquid for cooling is not uniformly distributed on the surface of the content are raised, thus it is likely to bring about unstable reaction due to non-uniform cooling as well as "Entrai".

DISCLOSURE OF THE INVENTION

In such circumstances, an object of the present invention is to provide a method for extracting a gaseous fluid which is capable of suppressing the entrainment of fine particles and mist, curtailing clogging of a filter and the like, contriving uniformization for the temperature of the content and at the same time, ensuring a stable operation in the case of extracting a gaseous fluid through extraction ports set up on the top face portion of a vertical-type agitation tank.

As the result of intensive extensive research and investigation accumulated by the present inventors, it has been found that the above-mentioned object is achieved by setting up two extraction ports at positions that are approximately symmetrical about the center of the upper side portion of a vertical-type agitation tank, or at least three extraction ports each at a vertex of an approximately regular polygon (at least an equilateral triangle) having the central point identical with the center of the top face portion of the vertical-type agitation tank, or one extraction port approximately at the center of the top face portion thereof in addition to the above-mentioned two or at least three extraction ports, since the internal swirling flow is uniformized, the influence of the swirling flow in the vicinity of the extraction ports can be minimized, whereby the amount of the entrainment can be curtailed and at the same time, a liquid to be sprayed for the purpose of cooling and suppressing the entrainment can be uniformly distributed. Such being the case, the present invention has been accomplished on the basis of the foregoing findings and information.

Specifically, the present invention provides (1) a method for extracting a gaseous fluid which comprises extracting a gaseous fluid through extraction ports set up on the top face portion of a vertical-type agitation tank equipped inside with an agitator, characterized in that two extraction ports are set up at positions approximately symmetrical about the center of the top face portion of said vertical-type agitation tank or as the case may be, additional one extraction port is set up approximately at the center of the top face portion thereof; and (2) a method for extracting a gaseous fluid which comprises extracting a gaseous fluid through extraction ports set up on the top face portion of a vertical-type agitation tank equipped inside with an agitator, characterized in that at least three extraction ports are installed each at a vertex of an approximately regular polygon (at least an equilateral triangle) having the central point identical with the center of the top face portion of the vertical-type agitation tank or as the case may be, additional one extraction port is set up approximately at the center of the top face portion thereof.

In addition, a preferred embodiment according to the present invention comprises a method in which the above-mentioned vertical-type agitation tank is equipped with a spraying mechanism in the vicinity of any of the internal fluid extraction ports.

In each of the drawings, reference numerical and symbols shall have the following designations. 1: cylindrical tank; 2: agitator; 3: top face portion; 4, 4*a*, 4*b*, 4*c*, 4*d*: fluid extraction ports; 5: content in the vertical-type agitation tank; 6*a*, 6*b*: bar-shaped articles; 7*a*1, 7*a*2, 7*b*1, 7*b*2: temperature sensors; A: a center of the top face portion.

THE MOST PREFERRED EMBODIMENT TO CARRY OUT THE INVENTION

In the method for extracting a gaseous fluid according to the present invention, a vertical-type agitation tank equipped inside with an agitator and equipped on the top face portion with at least two fluid extraction ports is employed.

The form and shape of the above-mentioned vertical-type agitation tank are not specifically limited, but may be selected for use from a variety of shapes in accordance with the purpose of the use, other situations and the like. Of these, an approximately cylindrical agitation tank is generally used.

In addition, the agitation blade is not specifically limited, but may be selected for use from a variety of conventional well known agitation blades in accordance with the purpose of the use and the like. For instance, in the case of agitating a powdery or granular material, a helical blade or a ribbon blade is well suited for the use.

In the method according to the present invention, for the purpose of suppressing the generation of entrainment and non-uniform cooling, the positions of at least two fluid extraction ports comprise the embodiments as described hereunder.

(1) Two fluid extraction ports are set up at positions approximately symmetrical about the center of the top face portion.

(2) One fluid extraction port is set up approximately at the center of the top face portion along with the above-mentioned fluid extraction ports according to the item (1).

(3) At least three extraction ports are set up each at a vertex of an approximately regular polygon (at least an equilateral triangle) having the central point identical with the center of the top face portion.

(4) One fluid extraction port is set up approximately at the center of the top face portion along with the above-mentioned fluid extraction ports according to the item (3).

By setting up the fluid extraction ports at such positions, it is made possible to uniformize the internal swirling flow, minimize the influence of the swirling flow in the vicinity of the extraction ports and at the same time, remarkably curtail the amount of the entrainment. Further it is made possible to uniformize the temperature of the contents in the agitation tank and suppress the generation of the entrainment, since a liquid to be sprayed for the purpose of cooling and suppressing the generation of the entrainment can be uniformly distributed as described hereinafter.

Figure 3:
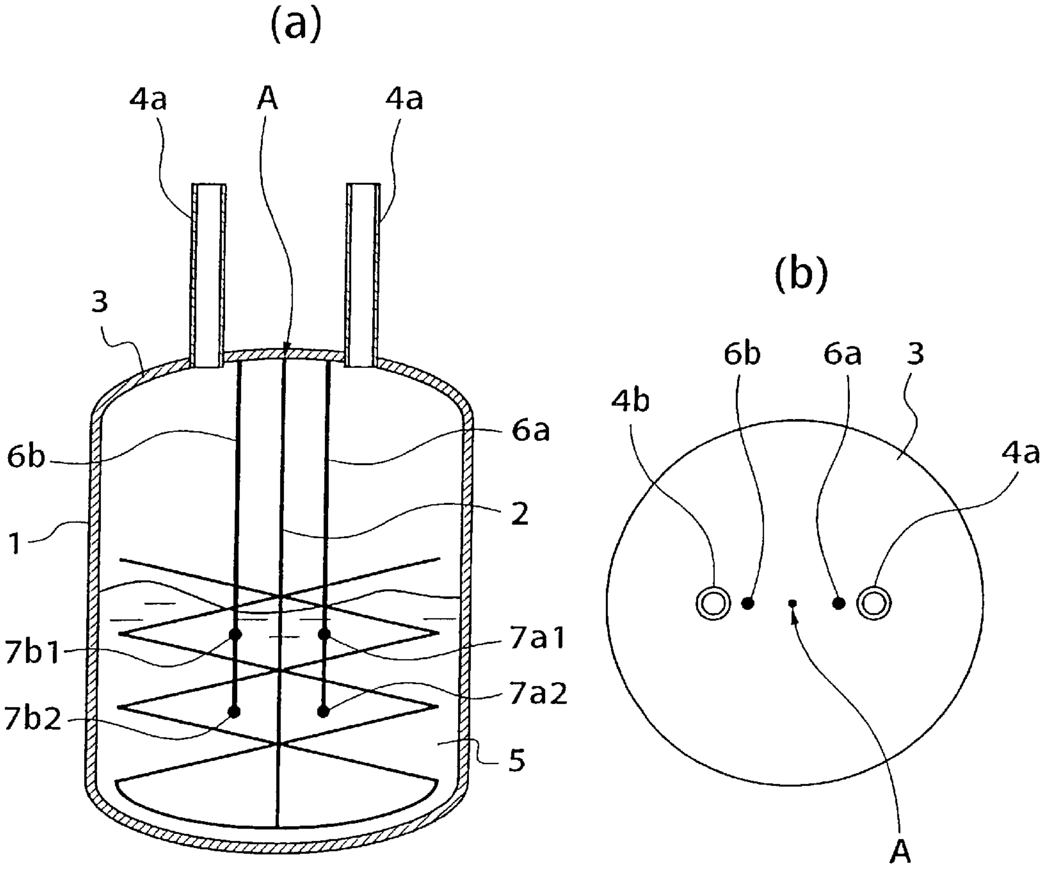
FIG. 3 consists of (a) a schematic side view and (b) a schematic plan view, respectively showing one example of positions of fluid extraction ports set up on the top face portion of a vertical-type agitation tank to be employed in the method according to the present invention.
Figure 4:
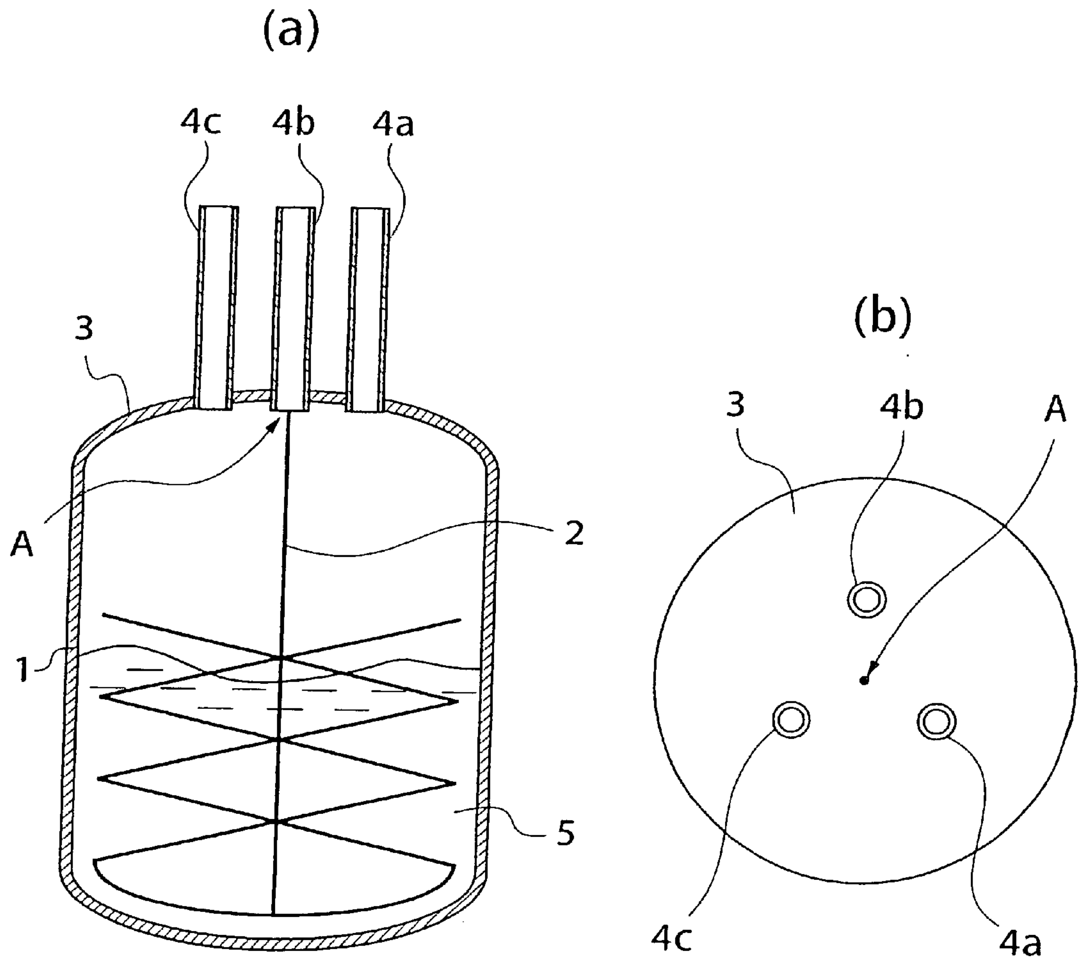
FIG. 4 consists of (a) a schematic side view and (b) a schematic plan view, respectively showing one example of different positions of fluid extraction ports set up on the top face portion of a vertical-type agitation tank to be employed in the method according to the present invention.
Figure 5:
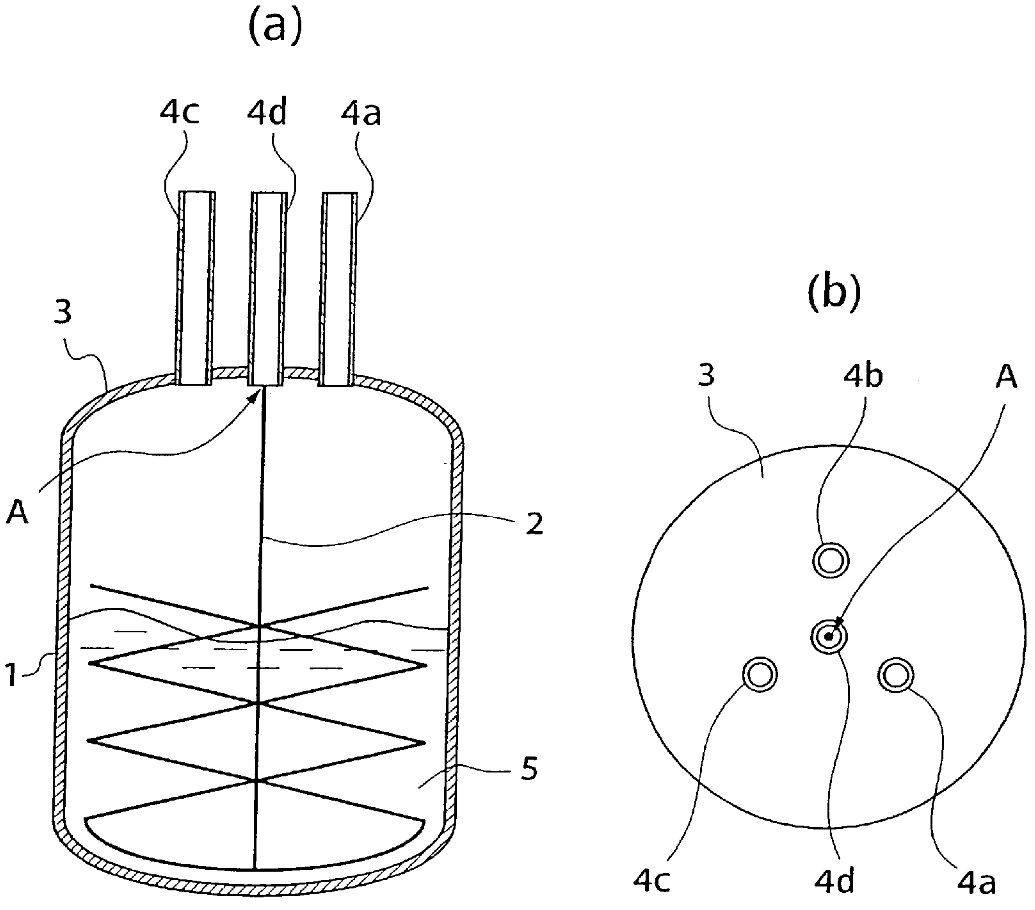
FIG. 5 consists of (a) a schematic side view and (b) a schematic plan view, respectively showing one example of further different positions of fluid extraction ports set up on the top face portion of a vertical-type agitation tank to be employed in the method according to the present invention.

FIGS. 3, 4 and 5 each consist of (a) a schematic side view and (b) a schematic plan view, respectively showing one example of different positions of a fluid extraction ports set up on the top face portion of a vertical-type agitation tank to be employed in the method according to the present invention. The vertical-type agitation tank as illustrated on FIG. 3 has such a structure that it is equipped with an agitator 2 inside an approximately cylindrical tank 1 and further with two fluid extraction ports 4*a*, 4*b* at positions approximately symmetrical about the center A of the top face portion 3. The vertical-type agitation tank as illustrated on FIG. 4 has such a structure that it is equipped with an agitator 2 inside an approximately cylindrical tank 1 and further with three fluid extraction ports 4*a*, 4*b* and 4*c* each at a vertex of an approximately equilateral triangle having the central point identical with the center A of the top face portion 3. The vertical-type agitation tank as illustrated on FIG. 5 has such a structure that it is equipped further with one fluid extraction port 4*d* approximately at the center of the top face portion 3 on the above-mentioned FIG. 4.

In the case where one fluid extraction port is set up only at about the center of the top face portion, there are caused such inconvenience and disadvantage as described hereinbefore. However, in the case where at least two fluid extraction ports are set up at positions approximately symmetrical about the center of the top face portion, and further one fluid extraction port is set up approximately at the center of the top face portion, there is not caused such inconvenience or disadvantage and in addition, there is a favorable tendency to suppress the generation of entrainment and decrease non-uniform cooling as compared with the above-mentioned case where at least two fluid extraction ports are set up at positions approximately symmetrical about the center of the top face portion.

In the case where the top face cross section is approximately circular in the method according to the present invention, it is preferable from the aspect of suppressing the generation of entrainment and the like that the center of any of the fluid extraction ports which are set up each at a position eccentric from the center of the top face portion of the agitation tank be situated L/5 to 4L/5 away from the center thereof in the radial direction of the cross section, wherein L is the radius of circle of the top face cross section of the agitation tank. Moreover, when the total cross sectional area of the fluid extraction ports is set on $S_1$ and the cross sectional area of the main portion in the agitation tank is set on $S_2$, the ratio $S_1/S_2$ is preferably ⅛ or smaller, particularly preferably 1/10 or smaller. When the ratio $S_1/S_2$ is within the above-defined range, the working effect of the present invention is effectively exhibited in particular. On the contrary, when the ratio $S_1/S_2$ is more than ⅛, the problem of "Entrai" is not so serious, whereby the application of the method according to the present invention becomes less significant. The cross sectional area of the main portion in the tank is substantially the same as that of the top face portion when the tank is approximately cylindrical. Unless the tank is in a simple form such as an approximately cylindrical form, the cross sectional area of the main portion in the tank is regarded as the cross sectional area at a highest position where the content in the vertical-type agitation tank comes in contact with the gas phase.

The fruition of the working effect according to the present invention increases with a decrease in the linear velocity of a gaseous fluid that flows in the tank. From the practical point of view, however, the aforesaid linear velocity of the fluid is preferably in the range of 0.1 to 10 cm/second.

In regard to the vertical-type agitation tank in the method according to the present invention, a spraying mechanism is preferably set up in the vicinity of the internal fluid extraction ports. This spraying mechanism is set up so as to spray a liquid onto the surface of the content in the agitation tank for the purpose of suppressing the generation of entrainment and also regulating the temperature of the content therein. In the method according to the present invention, since the internal swirling flow is uniformized by the fluid extraction ports that are set up on the top face portion of a vertical-type agitation tank as described hereinbefore, the liquid is uniformly distributed by the aforesaid spraying. Consequently the generation of entrainment is effectively suppressed and at the same time, temperature distribution of the content is uniformized.

The reaction or operation to which is applicable the method according to the present invention is not specifically limited provided that the reaction or operation comprises extracting a gaseous fluid from the top face portion of an agitation tank, but can be exemplified by a variety of reactions and operations, including gas phase polymerization of propylene in which use is made of the above-mentioned vertical-type agitation tank.

In the gas phase polymerization of propylene just mentioned, propylene is subjected to gas phase polymerization in the presence of a catalyst usually by the use of hydrogen as a molecular weight modifier. Accordingly, the gaseous fluid is a mixture of unreacted propylene and hydrogen, whereas the entrained substances are fine powders of polypropylene, the catalyst and the like. In the case where the method according to the present invention is applied to such gas phase polymerization of propylene, since the generation of entrainment is effectively suppressed, thus enabling to decrease the replacement frequency of a filter that is set up on the downstream side of the fluid extraction ports. In addition to the foregoing, the uniformity of temperature in a reaction tank can be enhanced, since liquid propylene for cooling can uniformly be sprayed onto the surface of the powders.

In the gas phase polymerization of propylene, when the production plant has a yearly production capacity of about 200,000 ton expressed in terms of polypropylene, the above-mentioned filter is greatly large-sized, thus requiring appurtenant equipment for the sake of replacement thereof. Further since an alkyl aluminum is employed as a catalyst component, a deactivation treatment is necessary prior to the replacement of the filter, whereby the work and operation are made terrible and troublesome. Fortunately, the decrease in the replacement frequency of a filter as mentioned above curtails the running cost of the production plant and at the same time, enhances safety thereof.

In the following, the present invention will be described in more detail with reference to working examples, which however shall never limit the present invention thereto.

EXAMPLE 1

Continuous gas phase polymerization of propylene was put into practice by the use of a gas phase propylene reaction tank as illustrated on FIG. 3 which was a vertical-type cylindrical reaction tank equipped inside with an agitator having a helical blade and equipped with two fluid extraction ports on the top face portion thereof at such a positions as approximately symmetrical about the center of the top face portion, in which the center of each of the fluid extraction ports was situated 2L/5 away from the center of the top face portion in the radial direction of the cross section, wherein L denoting the radius of circle of the top face cross section was 0.24 m (the same applied in the following examples and comparative examples) and in which the total cross sectional area of the two fluid extraction ports was 0.01 $m^2$, whereas the cross sectional area of the main portion in the tank was 0.18 $m^2$.

In addition to the foregoing, four temperature sensors were set up at four different positions inside a powder layer in the aforesaid vertical-type cylindrical reaction tank. The temperature sensors were provided on two bar-shaped articles 6*a*, 6*b* that were suspended from the top portion of the reaction tank in such a manner that they are prevented from colliding with the agitator blade even when rotated. The bar-shaped articles were each situated 0.07 m away expressed in terms of horizontal distance from the center of the reaction tank at positions symmetrical about the center thereof. Of the four temperature sensors, the sensors 7*a*1, 7*a*2 were provided on the bar-shaped article 6*a*, while the sensors 7*b*1, 7*b*2 were provided on the bar-shaped article 6*b*, such that the height of 7*a*1 and 7*b*1 was 0.5 m from the bottom of the reaction tank, and the height of 7*a*2, 7*b*2 was 0.3 m from the bottom thereof.

The reaction tank was continuously charged with propylene at a rate of 90 kg/hour; a catalyst which was composed of titanium tetrachloride and was supported on magnesium in an amount of 2.5 millimole expressed in terms of titanium atoms as a catalyst component of transition metal through a catalyst feed line (not shown on the drawings); triethylaluminum as a catalyst component of organoaluminum compound and dicyclopentyl dimethoxysilane as electron donor component through a catalyst feed line (not shown on the drawings) in such amounts that the molar ratio of triethylaluminum/dicyclopentyl dimethoxysilane was set on 10, and the molar ratio of Al/Ti was set on 90; and hydrogen at a rate of 0.05 kg/hour as a molecular weight modifier through a hydrogen gas feed line (not shown on the drawings). In the course of the continuous operation for gas phase polymerization of propylene, polymerization pressure and polymerization temperature were maintained at 3 MPa·G and 80° C., respectively.

In addition, during the continuous operation therefore, liquefied propylene was sprayed in the form of droplet with a diameter of 300 micron, approximately at an initial spraying velocity of 10.7 m/second for the purpose of preventing entrainment through a cooling sprayer placed just beneath the fluid extraction ports.

As a result, the continuous operation for a period as long as 700 hours was free from any operational trouble due to clogging of the filter located on the upper side of the fluid extraction ports. That is to say, problematic entrainment never occurred, while the temperature inside the reaction tank was stable ranging from 78 to 82° C.

EXAMPLE 2

Continuous gas phase polymerization of propylene was put into practice by the use of a gas phase propylene reaction tank as illustrated on FIG. 4 which was a vertical-type cylindrical reaction tank equipped inside with an agitator having a helical blade and equipped with three fluid extraction ports on the top face portion thereof each at a vertex of an approximately equilateral triangle having the central point identical with the center of the top face portion of the reaction tank, in which the center of each of the fluid extraction ports was situated 2L/5 away from the center of the top face portion in the radial direction of the cross section, and in which the total cross sectional area of the three fluid extraction ports was 0.01 $m^2$, whereas the cross sectional area of the main portion in the tank was 0.18 $m^2$.

In addition to the foregoing, four temperature sensors were set up at four different positions inside a powder layer in the aforesaid vertical-type cylindrical reaction tank. Although not shown on FIG. 4, the method for providing the temperature sensors and the positions to which the sensors were provided being the same as in the reaction tank on FIG. 3 that was used in Example 1.

Operational conditions and spraying conditions for cooling sprayer were the same as in Example 1.

As a result, the continuous operation for a period as long as 700 hours was free from any operational trouble due to clogging of the filter located on the upper side of the fluid extraction ports. That is to say, problematic entrainment never occurred, while the temperature inside the reaction tank was stable ranging from 79 to 82° C.

EXAMPLE 3

Continuous gas phase polymerization of propylene was put into practice by the use of a gas phase propylene reaction tank as illustrated on FIG. 5 which was a vertical-type cylindrical reaction tank equipped inside with an agitator having a helical blade and equipped with one fluid extraction port approximately at the center of the top face portion and also three fluid extraction ports on the top face portion thereof each at a vertex of an approximately equilateral triangle having the central point identical with the center of the top face portion of the reaction tank, in which the center of each of the fluid extraction ports was situated 2L/5 away from the center of the top face portion in the radial direction of the cross section, and in which the total cross sectional area of the four fluid extraction ports was 0.01 $m^2$, whereas the cross sectional area of the main portion in the tank was 0.18 $m^2$.

In addition to the foregoing, four temperature sensors were set up at four different positions inside a powder layer in the aforesaid vertical-type cylindrical reaction tank. Although not shown on FIG. 5, the method for providing the temperature sensors and the positions to which the sensors were provided being the same as in the reaction tank on FIG. 3 that was used in Example 1.

Operational conditions and spraying conditions for cooling sprayer were the same as in Example 1.

As a result, the continuous operation for a period as long as 700 hours was free from any operational trouble due to clogging of the filter located on the upper side of the fluid extraction ports. That is to say, problematic entrainment never occurred, while the temperature inside the reaction tank was stable ranging from 79 to 81° C.

Comparative Example 1

Figure 1:
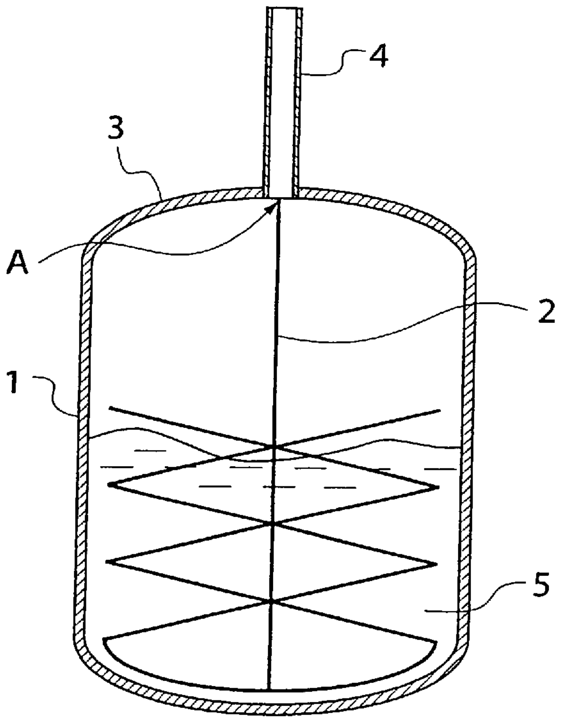
FIG. 1 PRIOR ART
FIG. 1 consists of (a) a schematic side view and (b) a schematic plan view, respectively showing one example of a position of a fluid extraction port set up on the top face portion of a conventional vertical-type agitation tank.
Figure 1:
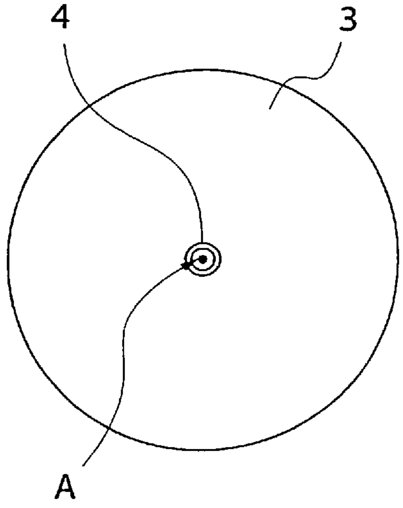
FIG. 1 PRIOR ART

Continuous gas phase polymerization of propylene was put into practice by the use of a gas phase propylene reaction tank as illustrated on FIG. 1 which was a vertical-type cylindrical reaction tank equipped inside with an agitator having a helical blade and equipped with one fluid extraction port approximately at the center of the top face portion and in which the total cross sectional area of the four fluid extraction ports was 0.01 $m^2$, whereas the cross sectional area of the main portion in the tank was 0.18 $m^2$.

In addition to the foregoing, four temperature sensors were set up at four different positions inside a powder layer in the aforesaid vertical-type cylindrical reaction tank. Although not shown on FIG. 1, the method for providing the temperature sensors and the positions to which the sensors were provided being the same as in the reaction tank on FIG. 3 that was used in Example 1.

Operational conditions and spraying conditions for cooling sprayer were the same as in Example 1.

As a result, at the time after the lapse of 100 hours from the start of the continuous operation, filter replacement became necessary by an operational trouble due to clogging of the filter located on the upper side of the fluid extraction port. Further the temperature inside the reaction tank was somewhat unstable ranging from 77 to 83° C.

Comparative Example 2

Figure 2:
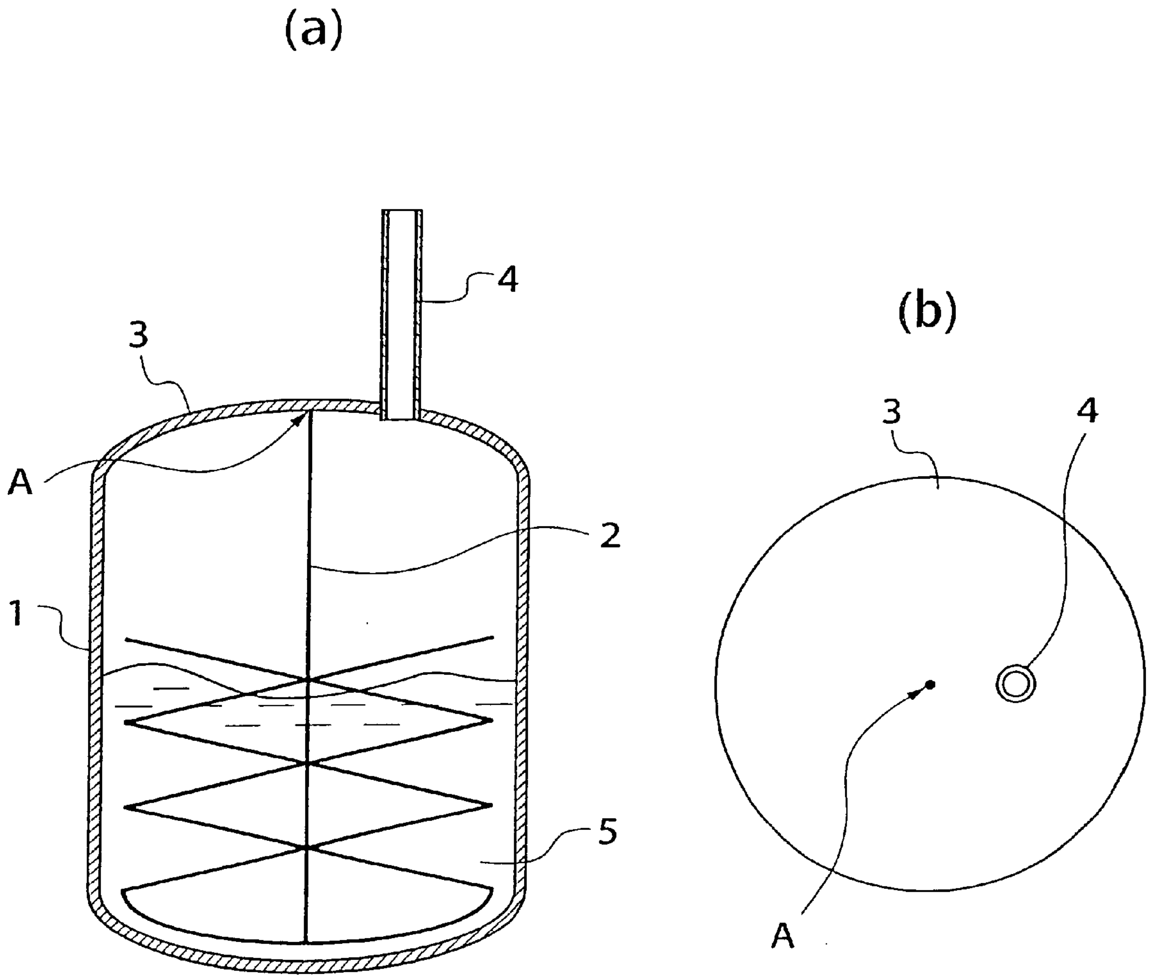
FIG. 2 PRIOR ART
FIG. 2 consists of (a) a schematic side view and (b) a schematic plan view, respectively showing one example of a different position of a fluid extraction port set up on the top face portion of a conventional vertical-type agitation tank.

Continuous gas phase polymerization of propylene was put into practice by the use of a gas phase propylene reaction tank as illustrated on FIG. 2 which was a vertical-type cylindrical reaction tank equipped inside with an agitator having a helical blade and equipped with one fluid extraction portion eccentrically 2L/5 away from the center of the top face portion and in which the cross sectional area of the four fluid extraction port was 0.01 $m^2$, whereas the cross sectional area of the main portion in the tank was 0.18 $m^2$.

In addition to the foregoing, four temperature sensors were set up at four different positions inside a powder layer in the aforesaid vertical-type cylindrical reaction tank. Although not shown on FIG. 2, the method for providing the temperature sensors and the positions to which the sensors were provided being the same as in the reaction tank on FIG. 3 that was used in Example 1.

Operational conditions and spraying conditions for cooling sprayer were the same as in Example 1.

As a result, at the time after the lapse of 200 hours from the start of the continuous operation, filter replacement became necessary by an operational trouble due to clogging of the filter located on the upper side of the fluid extraction port. Further the temperature inside the reaction tank was somewhat unstable ranging from 77 to 83° C.

Industrial Applicability

According to the present invention it is made possible to suppress the entrainment of fine particles and mist, curtail clogging of a filter and the like, contrive uniformization for the temperature of the content and at the same time, ensure a stable operation by extracting a gaseous fluid through a plurality of extraction ports each set up at a specific position on the top face of a vertical-type agitation tank.

What is claimed is:

1. A method for extracting a gaseous fluid, comprising extracting the gaseous fluid through two fluid extraction ports set up on the top face portion of a vertical-type agitation tank equipped inside with an agitator, wherein said two fluid extraction ports are set up at positions approximately symmetrical about the center of the top face portion of the vertical-type agitation tank.

2. The method for extracting a gaseous fluid according to claim 1, wherein one of said fluid extraction ports is further set up approximately at the center of the top face portion of said vertical-type agitation tank.

3. A method for extracting a gaseous fluid, comprising extracting the gaseous fluid through at least three fluid extraction ports set up on the top face portion of a vertical-type agitation tank equipped inside with an agitator, wherein said at least three fluid extraction ports are set up each at a vertex of an approximately regular polygon (at least an equilateral triangle) having the central point identical with the center of the top face portion of the vertical-type agitation tank.

4. The method for extracting a gaseous fluid according to claim 3, wherein one of said at least three fluid extraction ports is further set up approximately at the center of the top face portion of said vertical-type agitation tank.

5. The method for extracting a gaseous fluid according to claim 1, wherein at least on spraying mechanism is set up in the vicinity of said two fluid extraction ports inside said vertical-type agitation tank.

6. The method for extracting a gaseous fluid according to claim 2, wherein at least one spraying mechanism is set up in the vicinity of said two fluid extraction ports inside said vertical-type agitation tank.

7. The method for extracting a gaseous fluid according to claim 3, wherein at least one spraying mechanism is set up in the vicinity of said at least three fluid extraction ports inside said vertical-type agitation tank.

8. The method for extracting a gaseous fluid according to claim 4, wherein at least on spraying mechanism is set up in the vicinity of said at least three fluid extraction ports inside said vertical-type agitation tank.

* * * * *